(12) United States Patent
Wang et al.

(10) Patent No.: US 8,188,759 B2
(45) Date of Patent: May 29, 2012

(54) DRY HIGH POTENTIAL TESTER AND SOLAR SIMULATOR TOOL

(75) Inventors: Peter Wang, Santa Clara, CA (US); Harry Smith Whitesell, III, Santa Clara, CA (US); Danny Cam Toan Lu, San Francisco, CA (US); Tzay-Fa Su, San Jose, CA (US); Michael Marriott, Morgan Hill, CA (US); Xue Hong Ma, Xi'an (CN); Xiao Ning Li, Jingmen (CN); Jie Ling, Xi'an (CN)

(73) Assignee: Applied Materials, Inc., Santa Clara, CA (US)

(*) Notice: Subject to any disclaimer, the term of this patent is extended or adjusted under 35 U.S.C. 154(b) by 358 days.

(21) Appl. No.: 12/561,160

(22) Filed: Sep. 16, 2009

(65) Prior Publication Data
US 2011/0003404 A1  Jan. 6, 2011

(30) Foreign Application Priority Data
Jul. 6, 2009  (CN) .......................... 2009 1 0163371

(51) Int. Cl.
*G01R 31/26* (2006.01)
(52) U.S. Cl. ................................................ 324/761.01
(58) Field of Classification Search .............. 324/761.01
See application file for complete search history.

(56) References Cited

U.S. PATENT DOCUMENTS

| | | | |
|---|---|---|---|
| 6,753,692 B2 | 6/2004 | Toyomura et al. | |
| 7,749,917 B1 * | 7/2010 | Rana et al. ..................... | 438/765 |
| 2007/0108229 A1 * | 5/2007 | Fork et al. ..................... | 222/129 |
| 2009/0102453 A1 | 4/2009 | Kasahara et al. | |
| 2010/0301991 A1 * | 12/2010 | Sella et al. ..................... | 340/3.1 |

* cited by examiner

*Primary Examiner* — Thomas Valone
(74) *Attorney, Agent, or Firm* — Patterson & Sheridan, LLP

(57) ABSTRACT

A method and apparatus for testing a photovoltaic substrate disposes the substrate on a support gantry with connection points such as vacuum cups. The gantry is actuated into a test position. A probe nest coupled to the gantry connects to a junction box on the substrate. A power supply applies voltage to the junction box, and an actuated frame contacts an edge region of the substrate to detect any breakthrough current. The actuated frame comprises a liner for maximizing contact with the edge of the substrate. The liner may be conductive, or may have a conductive surface. Current sensors coupled to the conductive liner of the frame detect any breakthrough current. A solar spectrum simulator provides solar spectrum radiation for testing the photovoltaic properties of the substrate.

7 Claims, 5 Drawing Sheets

DRY HIGH POTENTIAL TESTER AND SOLAR SIMULATOR TOOL

FIELD

Embodiments of the present invention generally relate to apparatus and processes for testing and qualifying a photovoltaic device in a production line.

BACKGROUND

Photovoltaic (PV) devices or solar cells are devices which convert sunlight into direct current (DC) electrical power. Typical thin film PV devices, or thin film solar cells, have one or more p-i-n junctions. Each p-i-n junction comprises a p-type layer, an intrinsic type layer, and an n-type layer. When the p-i-n junction of the solar cell is exposed to sunlight (consisting of energy from photons), the sunlight is converted to electricity through the PV effect. Solar cells may be tiled into larger solar arrays. The solar arrays are created by connecting a number of solar cells and joining them into panels with specific frames and connectors.

Typically, a thin film solar cell includes active regions, or photoelectric conversion units, and a transparent conductive oxide (TCO) film disposed as a front electrode and/or as a back electrode. The photoelectric conversion unit includes a p-type silicon layer, an n-type silicon layer, and an intrinsic type (i-type) silicon layer sandwiched between the p-type and n-type silicon layers. Several types of silicon films including microcrystalline silicon film (μc-Si), amorphous silicon film (a-Si), polycrystalline silicon film (poly-Si), and the like may be utilized to form the p-type, n-type, and/or i-type layers of the photoelectric conversion unit. The backside electrode may contain one or more conductive layers.

With traditional energy source prices on the rise, there is a need for a low cost way of producing electricity using a low cost solar cell device. Conventional solar cell manufacturing processes are highly labor intensive and have numerous interruptions that can affect production line throughput, solar cell cost, and device yield. Typical solar cell qualification and testing devices utilize lamps that are configured to expose a substrate to a beam of light, and probes to detect the current generated. The lamps are positioned above the substrate and configured to shine a beam of light downwardly toward the horizontally positioned substrate. Additionally, a voltage is delivered to an edge region of the substrate to test the breakthrough voltage by manually attaching an electrical lead from a power supply to the edge region of the substrate. As the demand for using increasingly larger substrates and higher production throughput continues to grow, the floor space, time, and labor required for such testing and qualification hardware in fabrication facilities becomes problematic due to maintenance, cost of ownership, and throughput issues.

Therefore, there is a need for an automated test apparatus for photovoltaic substrates that provides for automated testing in a compact, easily maintained unit for use in high-volume manufacturing facilities.

SUMMARY

Embodiments described herein provide a test apparatus for a photovoltaic substrate, comprising a frame comprising a plurality of segments shaped to match an edge region of the substrate, an actuator coupled to each segment, a power supply positioned to contact electrical connectors embedded in the substrate, and an electrical sensor coupled to each segment.

Other embodiments provide a solar simulator module, comprising a solar spectrum source, a substrate support facing the solar spectrum source, a probe positioned to make electrical contact with a substrate on the substrate support, and a high potential test frame comprising a plurality of contact segments mounted on actuators configured to retract and extend the contact segments.

Other embodiments provide a method of processing a photovoltaic substrate, comprising disposing the substrate on a movable substrate support, actuating a plurality of electrically conductive segments into contact with an edge region of the substrate, moving the substrate disposed on the substrate support into a test position by actuating the substrate support, applying a voltage to the substrate through contacts embedded in the substrate, and exposing the substrate to solar spectrum radiation.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the invention generally provide methods and apparatus for processing a photovoltaic substrate. One set of embodiments provides a test apparatus for a photovoltaic substrate, such as a solar panel, comprising a frame comprising a plurality of segments, an actuator coupled to each segment, a power supply positioned to contact electrical connectors embedded in the substrate, and an electrical sensor coupled to each segment. The segments are generally shaped to match the shape of an edge region of the substrate, and to provide electrical contact with the edge of the substrate. In one embodiment, each segment contacts the edge of the substrate by virtue of an edge facing surface. In some embodiments, a back contact surface may also be provided to improve the electrical contact at the edge region of the substrate. A compliant member may also be provided to line each segment, either along the edge facing surface or along both the edge and back contact surfaces. The actuators are generally configured to move the segments in at least two orthogonal directions, so that the segments may be moved from a substrate loading position to a processing position, such as a test position.

Figure 1:
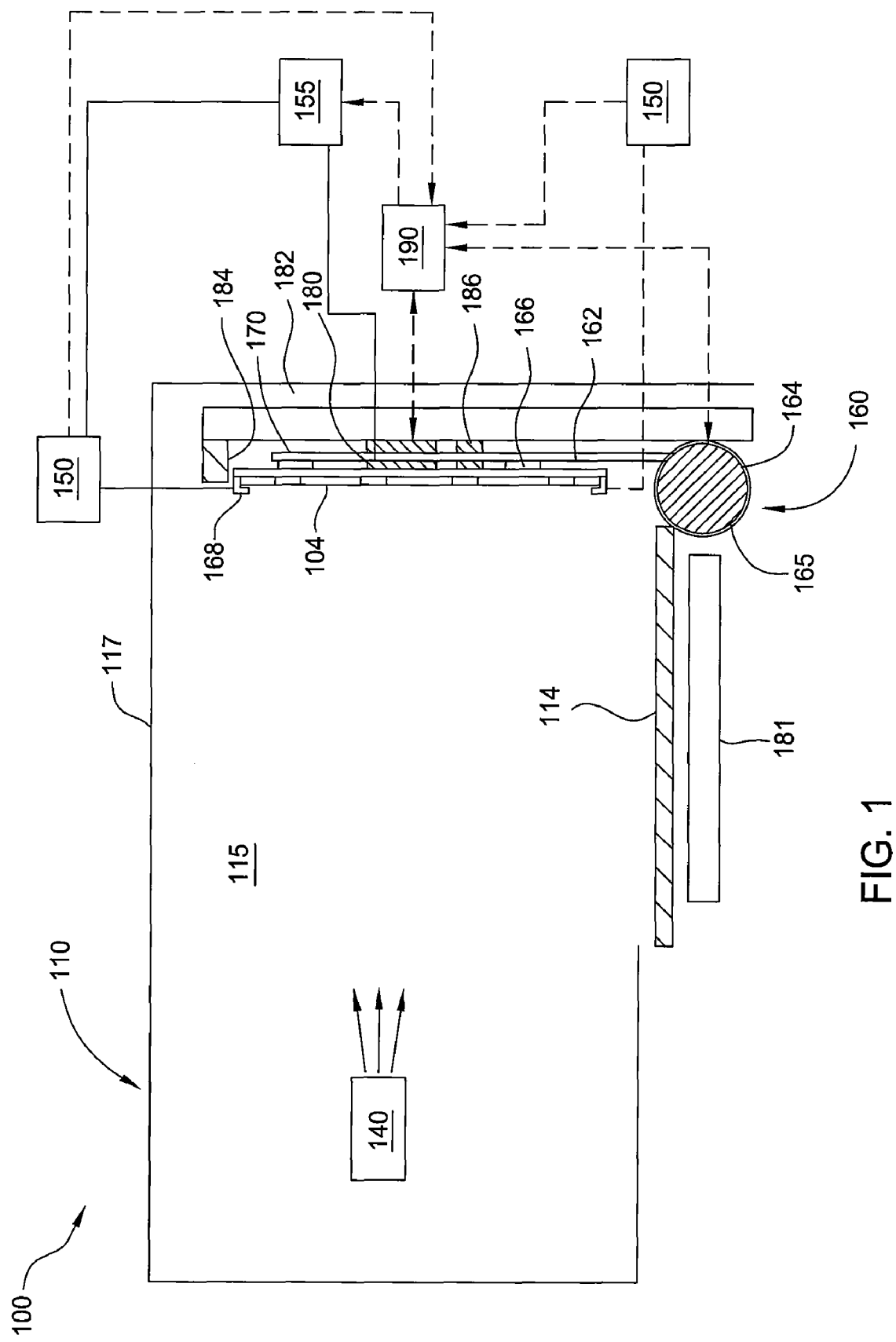
FIG. 1 is a schematic cross-sectional view of a solar simulator module according to one embodiment.

Other embodiments provide a solar simulator module, comprising a solar spectrum source, a substrate support facing the solar spectrum source, a probe positioned to make electrical contact with a substrate on the substrate support, and a high potential test frame comprising a plurality of contact segments mounted on actuators configured to retract and extend the contact segments. FIG. 1 is a schematic cross-sectional view of a solar simulator module 100 according to one embodiment. The solar simulator module 100 comprises a positioning robot 160 and a substrate support 162 coupled to the positioning robot 160. The positioning robot 160 comprises a rotary actuator 164 and a rotary brake 165. The substrate support 162 comprises a gantry 170 and a plurality of support elements 166 positioned to retain a substrate 104 against the gantry 170. In one embodiment, the support elements 166 are vacuum gripping elements.

In one embodiment, the rotary actuator 164 comprises a motor for rotating the substrate support 162 from a substantially horizontal loading or unloading position to a substantially vertical processing position. The rotary brake 165 provides holding capability in the event power is lost during movement of the substrate support 162. In the loading or unloading position, the substrate support 162 interacts with a factory automation device 181 that moves substrates 304 into and out of the module 100, lifting an unprocessed substrate 304 off the automation device 181, and replacing a processed substrate 304 back onto the automation device 181.

The module 100 further comprises a support member 182 for positioning one or more probe devices 180. The probe devices 180 generally measure the response of the substrate to electrical or radiant input. The one or more probe devices 180 generally comprise a probe nest for connecting to a connection point on the substrate 104. The connection point provides a configured connection between conductors disposed within the substrate and external circuits. The probe devices 180 are located at a point on the module 100 to facilitate contact with connectors disposed or formed in the substrate. The one or more probe devices 180 may also comprise a high potential probe for applying high voltage to one or more of the connection points on the substrate 104. A high voltage may be applied to a connection point of the substrate by coupling a power supply 155 to a high potential probe among the probe devices 180, and electrical sensors 150 may be coupled to a frame 168 disposed at an edge region of the substrate 104 to detect any current developed by the high voltage. The frame 168 may comprise a plurality of segments coupled to actuators for moving into a processing position or a loading and unloading position, as described in more detail below in conjunction with FIGS. 2, 3A, and 3B.

The module 100 further comprises an enclosure 110, which defines a processing space 115, in which the substrate 104 is disposed for processing. A solar spectrum source 140 is disposed in the processing space 115 for directing solar spectrum energy toward the substrate 104. The enclosure 110 comprises a wall 117 and a door 114. The door 114 may be retracted to allow the substrate support 162 to access the automation device 181 through an opening in the wall 117. The rotary actuator 164 rotates the substrate support 162 through the opening in the wall 117 into position to contact a substrate 104 on the automation device 181. The rotary actuator 164 then rotates the substrate support 162 through the opening in the wall 117 into the processing space 115 to a substantially vertical test position. The door 114 closes to exclude any extraneous light from the module 100.

Figure 2:
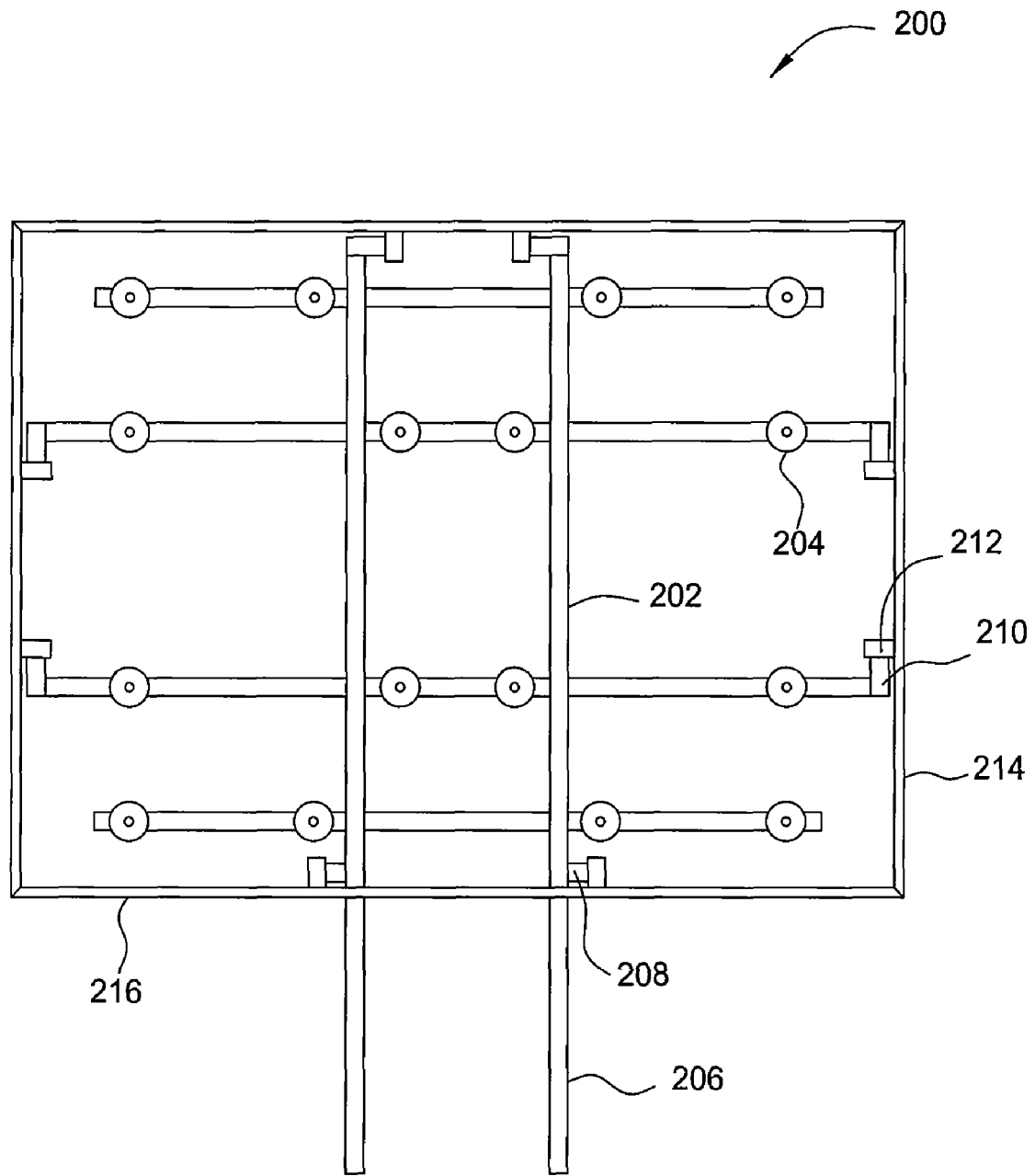
FIG. 2 is a front view of a substrate support according to another embodiment.

FIG. 2 is a front view of a substrate support 200 according to another embodiment. The substrate support 200 comprises a gantry 202 with support elements 204 attached thereto for contacting a substrate and holding it against the gantry 202 as the substrate support 200 moves from a loading or unloading position to a processing position or vice versa. Arms 206 extend outward from the gantry 202 for mating with an actuator (not shown) such as the rotary actuator 164 of FIG. 1. The substrate support 200 further comprises a frame 214, which comprises a plurality of segments 216, each segment 216 coupled to one or more actuators 208 configured to move the segments 216 in at least two orthogonal directions. Each actuator 208 generally comprises a first driver 210 and a second driver 212, both of which may be linear actuators, such as hydraulic piston drivers. In one embodiment, the segments 216 are substantially linear members that extend in a direction generally parallel to a plane defined by the surface of a substrate positioned on the substrate support. The actuators 208 are configured to move each segment 216 in a direction substantially perpendicular to the plane formed by the substrate surface, and in a direction substantially parallel to the plane formed by the substrate surface and substantially perpendicular to the major extent of the segment 216. The actuators 208 thus extend the segments 216 into a test position contacting the edge region of the substrate, and retract the segments 216 into a loading or unloading position clear of the substrate. Each segment 216 is configured to provide connectivity along the entire length of a substrate edge. In one embodiment, each segment 216 is at least 2,600 mm in length. In some embodiments, the frame 214 may be used as a high potential test frame.

Figure 3A:
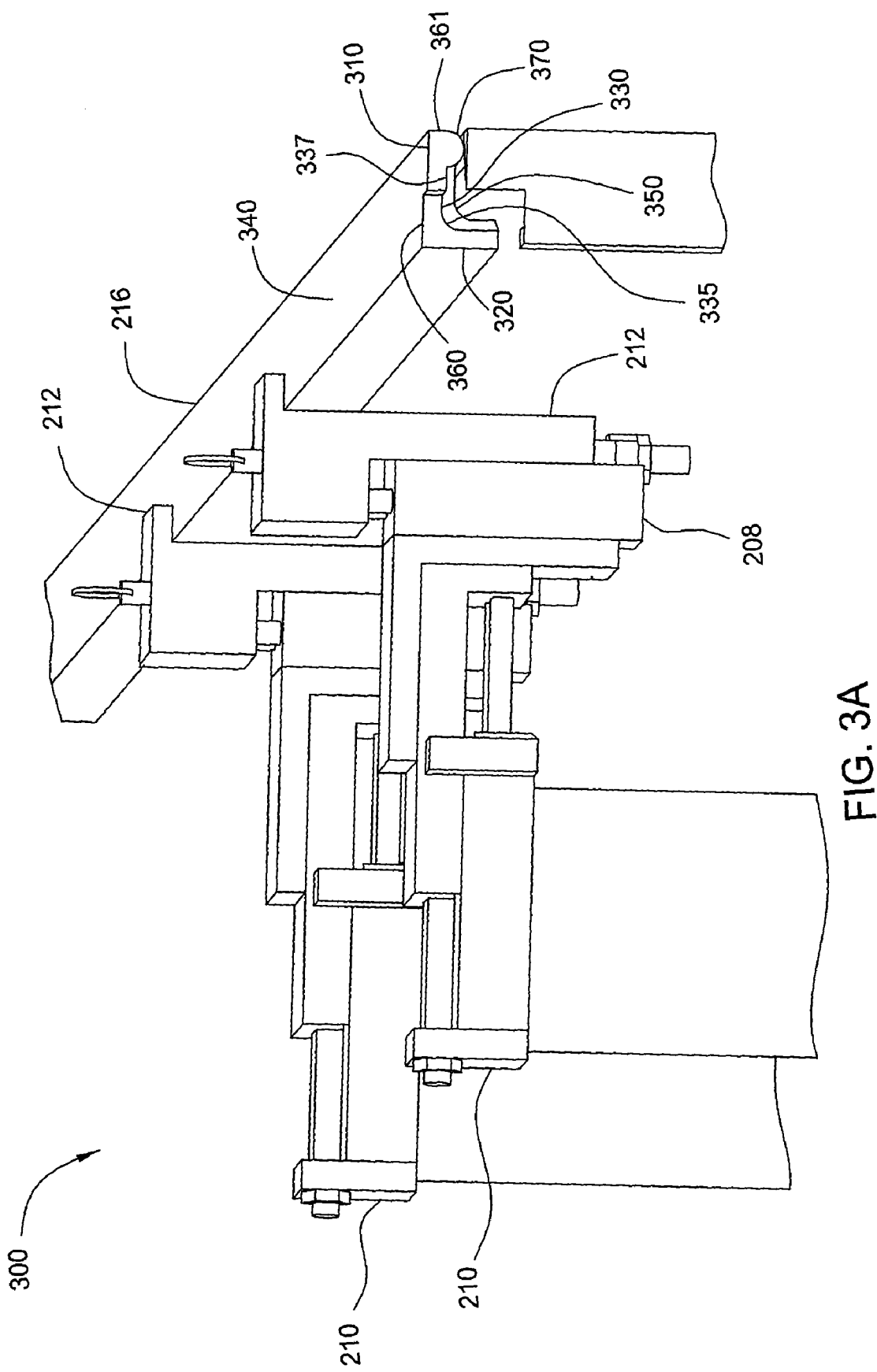
FIG. 3A is a detailed view of a portion of a solar simulator module according to another embodiment.

FIG. 3A is a detailed view of a portion of a solar simulator module 300 according to one embodiment. The module 300 comprises actuators 208 and segments 216, similar to the embodiment shown in FIG. 2. Each of the first and second drivers 210 and 212 extends along its major axis. The first and second drivers 210 and 212 are coupled together in an orthogonal relationship such that the first driver 210 moves the second driver 212, which is in turn coupled to a segment 216. The movement of the first driver 210 is orthogonal to the major axis of the second driver 212. By virtue of this orthogonal relationship, the actuators 208 move the segments 216 in at least two orthogonal directions to contact the edge region of a substrate.

A cross-section of the segment 216 is visible in FIG. 3A. The segment 216 comprises an edge facing portion 310 and a back facing portion 320. The edge facing portion 310 and back facing portion 320 extend in substantially orthogonal directions to accommodate the intended shape of most photovoltaic substrates. The segment 216 has an inner surface 330 and an outer surface 340. The inner surface 330 of the segment 216 has a curve 335 where the edge facing portion 310 and back facing portion 320 meet to facilitate use of a liner 350 to line the inner surface 330.

The edge facing portion 310 of the segment 216 has a first end 360 and a second end 361, wherein the first end 360 meets the back facing portion 320 at the curve 335 in the inner surface 330. The second end 361 has a lip 370 to facilitate alignment of the segment 216 with the substrate edge. The thickness of the lip 370, relative to the thickness of the edge facing portion 310, is generally large enough to guide the segment 216 into contact with the substrate at all points along the edge region of the substrate as the segment 216 is moved into the test position. The inner surface 330 of the segment 216 has a flat portion 337 between the start of the lip 370 and the start of the curve 335 at the meeting point of the edge facing portion 310 and the back facing portion 320 is generally large enough to accommodate the thickness of the substrate being processed. In some embodiments, the flat portion 337 has a length of at least about 7 mm. In other embodiments, the flat portion 337 has a length of at least about 5 mm.

Substrates to be processed in a solar simulator module may have non-flat edges. A front glass piece is commonly laminated onto a back glass piece having photovoltaic layers formed thereon. Imprecision in positioning the pieces for lamination may result in the finished substrate having an edge that is stepped. The liner 350 in FIG. 3A is a compliant material that conforms at least partially to the profile of the substrate edge to maximize contact between the segment 216 and the substrate edge. The liner 350 thus conforms to any misalignment of layers of the substrate, maximizing contact with all layers along the edge. The liner 350 may be a conductive material or a compliant material coated with a conductive coating. In one embodiment, the liner 350 is foam rubber coated with a conductive fabric. The thickness of the liner 350 is selected to maximize contact along the substrate edge, but in any event will be no less than the maximum misalignment along the substrate edge. For example, if the maximum misalignment of the substrate edge is 3 mm, meaning that one glass piece may not overhang another glass piece to which it is laminated by more than 3 mm, the thickness of the compliant liner 350 will be at least 3 mm. The liner 350 may be attached to the segment 216 by any adhesive adapted to bond the material of the liner 350 to the material of the segment 216. Segments having a liner such as the liner 350 that is conductive or has a conductive coating may, themselves, be conductive or non-conductive. If the liner 350 provides conductivity for the segment, the segment itself may be made of a non-conductive material, if convenient.

The back facing portion 320 of the segments 216 enhances alignment of the segments 216 with the substrate edge, and improves detection of breakthrough current by increasing the surface area over which contact is made at the edge of the substrate. The conductive liner 350 extends to cover the back facing portion 320. The liner 350 also cushions any contact between the segments 216 and the substrate surface.

Figure 3B:
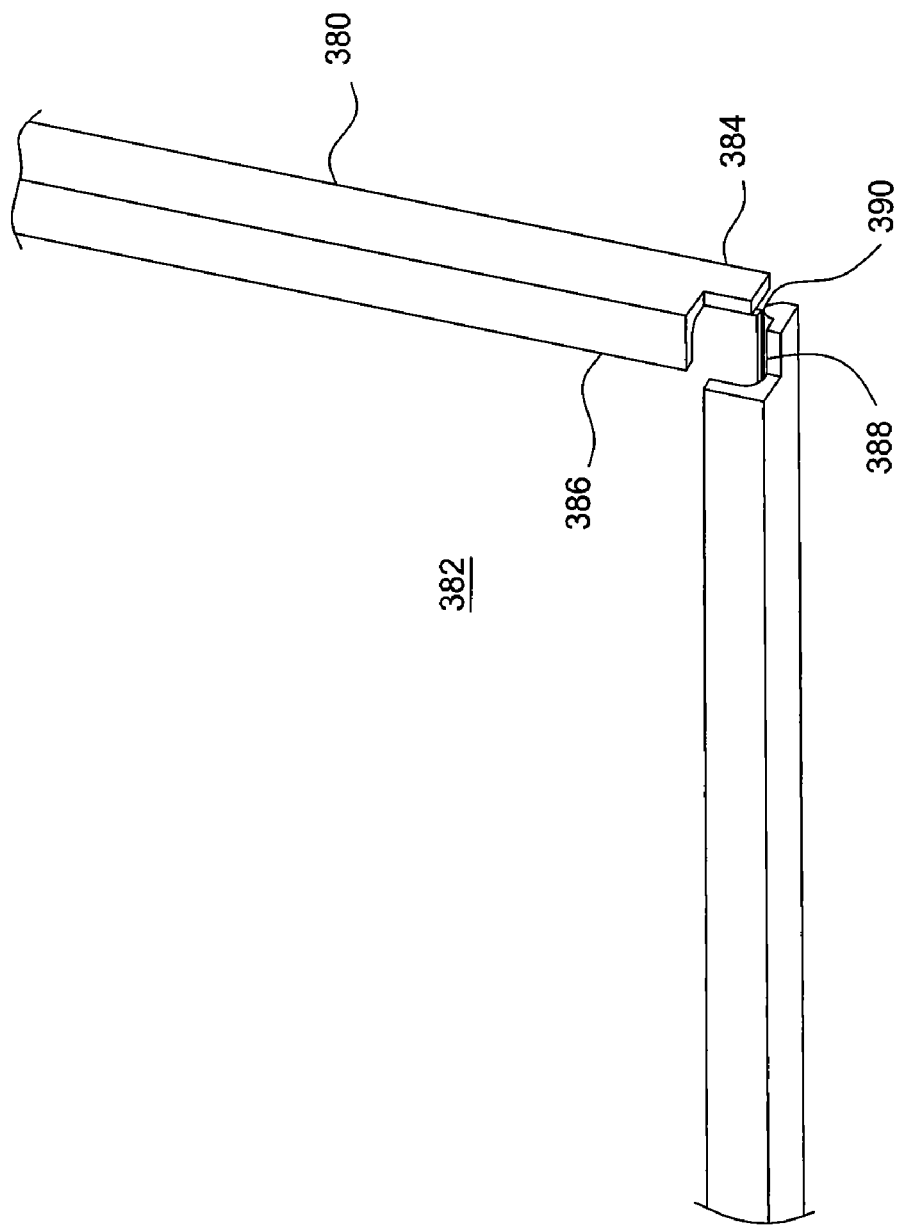
FIG. 3B is a detailed view of a test apparatus according to another embodiment.

The segments 216 are configured to provide coverage of at least 95% of the edge region of the substrate being processed. In some embodiments, the segments 216 may be configured to provide essentially 100% coverage. FIG. 3B is a detailed view of a test apparatus according to one embodiment. The test apparatus of FIG. 3B comprises one or more segments 380 disposed as electrical contacts around an edge region of a substrate 382. Each of the segments 380 has an edge facing portion 384 and a back facing portion 386. In the embodiment of FIG. 3B, the edge facing portions 384 of two segments 380 meet at a corner 390 of the substrate 382. The edge facing portions 384 of the segments 380 thus cover essentially 100% of the edge of the substrate 382. Each of the segments 380 has a notch 388. The notch 388 enables essentially complete coverage of the edge of the substrate 382 by the edge facing portions 384 of the segments 380, without overlapping interference from the back facing portions 386.

Figure 4:
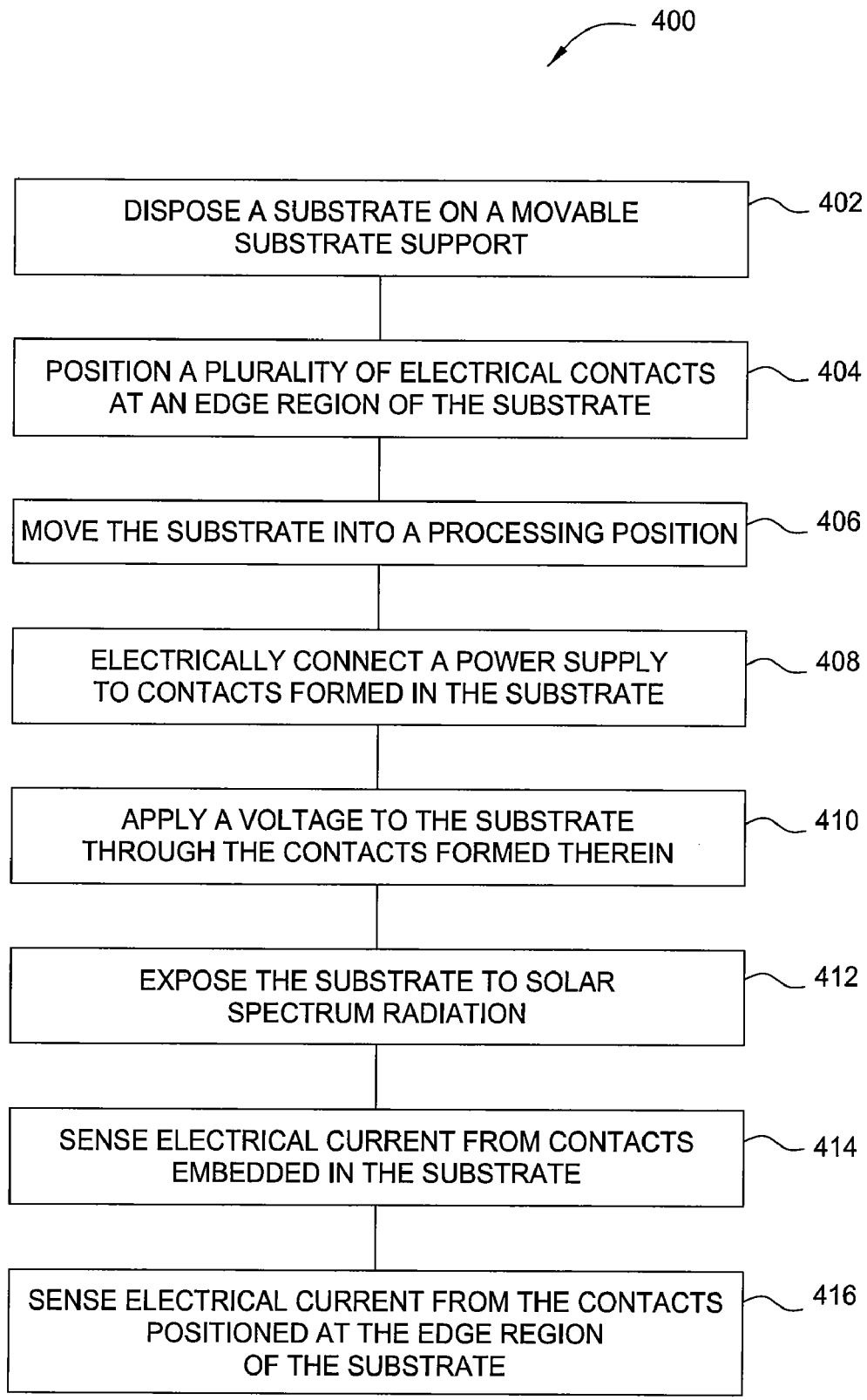
FIG. 4 is a flow diagram summarizing a method according to another embodiment.

Embodiments described herein provide methods for processing photovoltaic substrates. FIG. 4 is a flow diagram summarizing a method 400 according to one such embodiment. The method of FIG. 4 is useful for determining electrical characteristics, such as breakthrough voltage, of a substrate.

A 402, a substrate is disposed on a movable substrate support. The movable substrate support provides the capability to position the substrate alternately in a loading or unloading position and in a processing position. At 404, a plurality of electrical contacts is positioned to contact the substrate at an edge region of the substrate. In some embodiments, the electrical contacts positioned at the edge region of the substrate are conformed to edge contours of the substrate to ensure maximum electrical contact. Each electrical contact may simultaneously engage the edge of the substrate and a portion of the back surface of the substrate. Such extended contact may improve the function of the electrical contact by increasing the contact surface area, thereby improving transmission of current between the substrate and the contact.

The substrate is moved into a processing position at 406. At 408, a power supply is connected to contacts formed or disposed in the substrate. Many photovoltaic substrates have a junction box that collects contacts dispersed throughout the substrate. The junction box provides a convenient location for connecting the substrate to external circuits. In some embodiments, a probe nest may be provided on the substrate support for connecting the substrate to the power supply or to other devices, such as sensors or loads.

At 410, a voltage is applied to the substrate through its internal contacts. The voltage applied may be any voltage selected to test desired electrical characteristics of the substrate. In some embodiments, a high voltage is applied to test the potential for current breakthrough to the edge of the substrate. Depending on the substrate, a voltage up to about 5 kV may be applied. In most cases, the voltage will be about 2 kV or less. The voltage will generally be applied for about 1 second or less, because any detectable current leakage due to the high voltage will be detected almost instantaneously. In some embodiments, the voltage is maintained for about 0.1 sec or less.

At 412, the substrate is exposed to solar spectrum radiation to determine its photovoltaic characteristics. At 414, electrical current generated by the photovoltaic substrate and flowing through the contacts in the substrate is measured. At 416, electrical current flowing to the contacts at the edge region of the substrate is sensed or measured. Electrical current detected at the edge region when high voltage is applied to the substrate may indicate current breakthrough.

In alternate embodiments, the substrate support 200 of FIG. 2 may have any number of actuators 208 for each segment 216. For example, each segment 216 may be controlled by one actuator positioned near the center of the segment 216. The substrate support gantry 202 may be configured to provide attachment points for actuators 208 at any convenient location. Actuators 208 may also be configured with more than one attachment point between a segment 216 and an actuator 208. For example, each actuator 208 may be connected to a segment 216 by a connector that attaches to the segment 216 at more than one location, so that a balanced force may be delivered from the actuator 208 to the segment 216 at more than one location on the segment 216.

In other alternate embodiments, the actuators 208 may be hydraulic, or may be energized by other methods. For example, at least some of the actuators 208 may be screw-type actuators, feedback actuators, track actuators, or electromagnetic actuators. In some embodiments, the actuators 208 may be configured to move the segments 216 in three orthogonal directions using three linear actuators coupled together along the three orthogonal axes, or using three-dimensional positioning actuators such as six-axis positioners.

The segments 216 of FIGS. 2 and 3A, and the segments 380 of FIG. 3B are shown as continuous members extending substantially the full length of the edge of the substrate and terminating at or near the corners of the substrate. The embodiment of FIG. 2 shows four segments 216, one for each edge of the substrate, with each segment 216 ending at the corners. In alternate embodiments, the segments may be angled to contact two or more different edges of the substrate. For example, each segment may extend from one corner of the substrate along the two edges of the substrate that meet at that corner. The two legs of the segment may have equal or unequal length. In one embodiment, two segments may cover the four sides of a rectangular substrate, each segment having two legs that extend from a corner, the two segments covering diagonally opposite corners of the substrate. In such an embodiment, actuators may be configured to move the two segments in opposite directions along the diagonal path passing through the two corners covered by the two segments.

In some embodiments, the segments may be configured to meet along edges, rather than at corners, to eliminate the need to shape the segment ends, for example with notches, to prevent overlap. In embodiments wherein the ends of segments meet at the corners of a substrate, shapes other than that shown in FIG. 3B may be used for the ends of the segments. For example, the two segment ends may be trimmed at angles or 45° or greater to eliminate portions of the two segments that would overlap. In such an embodiment, the ends of each segment would form an angle of 45° or greater with the outer surface of the segment opposite the edge facing portion of the segment. Two such segments having angled ends may be disposed along adjacent edges of a substrate such that they cover essentially 100% of the edges without overlapping at their respective back facing portions. In another embodiment, one segment end may be notched while another is not notched. In an embodiment featuring one such segment for each edge of a rectangular substrate, each segment may have a notched end and an un-notched end, with the notched end of each segment oriented toward the un-notched end of another segment.

In another alternate embodiment, the segments 216 may be grouped into a first portion and a second portion, which may be actuated to contact the substrate at different times. For example, the first portion may contact the substrate during a time when the second portion is not contacting the substrate, and the second portion may contact the substrate during a time when the first portion is not contacting the substrate. In this manner, substrates with edges shorter than the segments 216 may be processed.

In other embodiments, the segments 216, and edge detectors generally, may comprise more than one segment for each substrate edge. For example, a rectangular substrate may be processed by positioning two edge detectors at each edge of the substrate. Using more edge detectors to detect current breakthrough may yield more detailed information about any structural nonconformance within the substrate. The pattern of detected current among the detectors may be analyzed for information about weaker and stronger areas of the substrate, if desired.

The segments and edge detectors described herein may be rigid, substantially rigid, flexible, or substantially flexible. The segments 208 of the embodiment shown in FIG. 2 are substantially rigid, so they may be manipulated by the actuators 208 at few points of contact. In one embodiment, a flexible or substantially flexible edge contact may be applied to the edges using holders at each end of each flexible edge contact. The holders may be actuated to make contact between the edge contacts and the edge of the substrate, for example by pulling each flexible edge contact down around the corners of the substrate. In other embodiments, a flexible or substantially flexible edge contact may be coupled with a rigid or substantially rigid support member that facilitates contacting the edge contact with the edge of the substrate. The support member may be a continuous member substantially covering or containing the edge contact, or it may be partially or completely discontinuous. For example, a flexible or substantially flexible edge contact may be applied to the edge of the substrate and rigid or substantially rigid support members applied at the corners of the substrate to secure the edge contact to the substrate. In another embodiment, a support member may extend the full length of one or more edges of the substrate while covering only part of the width of the substrate edge, leaving most of the edge contact uncovered by the support member.

The segments 216 of the embodiment of FIG. 3A are shown as continuous members having continuous edge facing portions 310 and back facing portions 320, with the edge facing portions having a continuous lip 370. In alternate embodiments, the edge facing portions 310 may be discontinuous. For example, the edge facing portions 310 may have openings, holes, notches, or slots. In some embodiments, the edge facing portions 310 may comprise a plurality of fingers extending outward from the back facing portions 320 that function to facilitate electrical contact between the liner 350 and the substrate edge. In other embodiments, the back facing portions 320 may be discontinuous, with openings, holes, notches, or slots. In one embodiment, the segment may be a support member for a compliant contact member, the support member comprising a rod with fingers extending outward from the rod in two orthogonal directions, the fingers functioning to facilitate electrical contact between a compliant contact member disposed between the fingers and an edge of a substrate. In other embodiments, the inside surface 330 of the segment 216 may form a corner, rather than the curve 335. In such an embodiment, the liner may be applied piecewise, for example one piece applied to the inside surface 330 along the edge facing portion 310 and another piece applied to the inside surface 330 along the back facing portion 320, to improve retention at the corner.

In other embodiments, the lip 370 may be discontinuous. For example, the lip may be a series of protrusions at an end of the edge facing portion 310 of a segment 216. The protrusions may be any convenient shape, such as spherical, oblate, conical, frustro-conical, cylindrical, cylinder-shaped, or that of a rectangular prism (ie. box-shaped). In other embodiments, the lip 370 may have a different cross-sectional shape from that shown in the embodiments of FIGS. 3A and 3B. In some embodiments, the shape may be oval, rectangular, triangular, trapezoidal, hemi-hexagonal, hemi-octagonal, or generally hemi-polygonal. In some embodiments, the lip 370 may be replaced with a front contact portion, which may be similar to any of the back facing portion embodiments described herein. In one embodiment, the lip 370 may be replaced with a plurality of spaced apart fingers extending from the edge facing portion 310 parallel to the back facing portion 320.

In some embodiments, the inner surface of the edge contact member, such as the inner surface 330 of the segment 216, or a similar inner surface of a support member for accommodating a compliant member, may be textured to facilitate retention of a liner or compliant member. Such texturing may be formed by abrading, blasting, or otherwise treating the inner surface after the member is formed, or the member may be formed or molded with the texture.

In a method of processing a rectangular substrate, such as the method 400 of FIG. 4, electrical current at the edge of the substrate may be sensed one edge at a time, or two edges at a time in some alternate embodiments. In some embodiments, substrates of different sizes may be processed in one apparatus by having edge contacts sized to accommodate the largest substrate, and applying the edge contacts one at a time or two at a time to the edge of a substrate. For a substrate having edges shorter than the edge contacts, each edge may be probed separately, or the edge contacts for two opposite edges of the substrate may be engaged simultaneously to avoid interference of one edge contact with another. In such an embodiment, the voltage may be applied continuously to the substrate while the edge contacts are cycled, or the voltage may be interrupted when no edge contact is touching the substrate. In general, some embodiments may benefit from a first cycle in which a first plurality of edge contacts engages the substrate and a second cycle in which a second plurality of edge contacts engages the substrate. The voltage may be maintained between the first and second cycles, or it may be interrupted.

In some methods, engagement of the edge contacts may commence after the substrate is disposed on the substrate support, but before it is moved into position for exposure to solar spectrum radiation. For example, a hi-potential test may be performed while the substrate is being moved into position for a solar flash test. In other embodiments, the solar flash test may be performed first. Depending on the embodiment and on the substrate being tested, the desired order of processing may be changed. Some substrates may be beneficially processed by a solar flash process followed by a high voltage process, or vice versa, depending on details of the construction and function of the substrate.

In some embodiments, multiple process cycles of applying high voltage and sensing current at one or more edges may be desired. For example, a process cycle in which a high voltage is applied, a solar flash is applied, and then a high voltage is applied may reveal information about the expected function or lifespan of the substrate. Process cycles involving multiple alternating high voltage and solar flash cycles may be performed to detect any structural or functional anomalies not detectable by single cycles.

In one embodiment, a method of producing a photovoltaic substrate may comprise forming one or more p-i-n junctions on a glass, polymer, metal, or other suitable substrate. A transparent conductive oxide layer is generally formed between the substrate and one of the p-i-n junctions. A p-i-n junction is formed by forming a p-type layer on the substrate, and intrinsic type layer on the p-type layer, and an n-type layer on the intrinsic type layer. The layers of the p-i-n junction may have any of a variety of crystal morphologies, including amorphous, polycrystalline, microcrystalline, and nanocrystalline. The p-i-n junctions may include one or more buffer layers between the junctions or between layers of the individual junctions. A second transparent conductive oxide layer is generally formed over the one or more p-i-n junctions before forming the back contact layer, which is generally conductive, and may be metal. Connectors, such as side and cross busses, may be formed on the back contact layer in electrical communication with at least one of the p-i-n junctions to collect current produced by the substrate. The busses may be formed such that they converge at a junction box conveniently located to allow electrical contact with external circuits. A side buss, for example, may be located near a side of the substrate, while a cross buss may cross through the center of the substrate or may connect to the junction box. An insulating layer is generally formed over the back contact layer and busses or connectors, and a second substrate may be bonded to the first substrate, containing the electrical elements. The substrate thus formed may then be subjected to the processing steps described above, wherein a high voltage is applied to the junction box and current is detected at the edge regions of the substrate, and wherein the substrate is exposed to simulated solar radiation and current is detected at the junction box of the substrate.

While the foregoing is directed to embodiments of the invention, other and further embodiments of the invention may be devised without departing from the basic scope thereof.

What is claimed is:

1. A apparatus used to test a photovoltaic substrate, comprising:
   a frame comprising a plurality of segments shaped to match a contour of an edge region of the photovoltaic substrate;
   an actuator coupled to each segment;
   a power supply positioned to contact electrical connectors disposed within the photovoltaic substrate; and
   an electrical sensor coupled to each segment.

2. The apparatus of claim 1, wherein each segment is an edge connector comprising an edge facing portion, a back facing portion, and a compliant member lining the edge facing portion.

3. The apparatus of claim 1, wherein each actuator comprises a plurality of linear actuators oriented in at least two orthogonal directions.

4. The apparatus of claim 1, wherein each segment comprises a conductive liner, and each of the electrical sensors is coupled to the conductive liner of a segment.

5. The apparatus of claim 1, wherein the frame covers at least about 95% of the edge region of the substrate.

6. The apparatus of claim 1, further comprising a controller coupled to the actuator of each segment, the power supply, and the electrical sensors, wherein the controller is configured to move the plurality of segments between a substrate loading position and a test position.

7. The apparatus of claim 1, wherein each segment comprises a conductive liner electrically coupled to one of the electrical sensors, and a controller is coupled to the actuator of each segment and configured to move the plurality of segments between a substrate loading position and a test position, wherein the conductive liner of each segment contacts an edge portion of the substrate when the segment is in the test position, and wherein the electrical sensors are current sensors.

* * * * *